United States Patent Office 3,240,820
Patented Mar. 15, 1966

3,240,820
PROCESS FOR THE SEPARATION OF BORIC ACID FROM ORGANIC LIQUIDS
Harry Olenberg, Bronx, N.Y., and Lionel Kantrowitz, Weehawken, N.J., assignors to Halcon International, Inc., a corporation of Delaware
No Drawing. Filed Jan. 16, 1962, Ser. No. 166,698
6 Claims. (Cl. 260—631)

This invention relates to the separation of boric acid from an organic liquid. More specifically, this invention teaches a means of facilitating the centrifugation of solid boric acid in admixture with organic liquids.

In the chemical process industries boric acid is found in admixture with organic liquids. For example, the boric acid may be formed in such solutions as a result of the decomposition of boron compounds. In such situations, it is convenient to separate the solid boric acid by centrifugation, thus obtaining a filter cake of the acid and a filtrate comparatively free of the acid. However, centrifuging the acid from organic mediums has met with considerable difficulty because the rates of filtration are exceedingly slow.

In accordance with this invention it has been found that by performing the centrifugal separation in the presence of water that the rate of filtration can be markedly increased. Sufficient water must be added to at least saturate the organic liquid and preferably enough water is present to form a separate water phase. The amount of water needed for saturation or to form an excess water phase depends on the particular organic liquid present and the temperature of the system. This may readily be determined by one skilled in the art.

Since certain organic liquids are completely miscible with water, and therefore incapable of being saturated therewith, the instant invention is preferably practiced with systems wherein the organic liquid (1) dissolves a finite amount of water and (2) is a liquid at room temperature. Particularly preferred are organic liquids containing at least 1.0 wt. percent, preferably at least 3% of a water-immiscible alcohol. A "water-immiscible alcohol" as used herein refers to an alcohol having a solubility of less than 20 gm. in 100 ml. of water at 20° C. This includes aliphatic and cyclic paraffinic and olefinic alcohols and substituted derivatives thereof having at least four carbon atoms per molecule. Examples of these alcohols include n-, iso-, and sec-butanol, the aliphatic pentanols, hexanols, hexenols, octanols and dodecanols and the cyclic pentanols, hexanols, hexenols, and heptanols and substituted derivatives thereof, such as methylcyclohexanol and dimethylcyclohexanol.

While the preceding paragraph defines numerous pure compounds from which boric acid may be separated in accordance with this invention, it is to be understood that the "organic liquid" may be a mixture of the above alcohols or a mixture containing other water-immiscible compounds. For example, the organic liquid may contain hydrocarbons, ketones and/or aldehydes having the same or different number of carbon atoms than the alcohol. Most preferably, however, the organic liquid contains the alcohol, the hydrocarbon precursor thereof and corresponding ketones and aldehydes.

The maximum amount of water added is primarily dependent on practical considerations. For example, large quantities of water are generally avoided since this would result in the necessity of centrifuging large quantities of material. This drawback, however, can be overcome by allowing the boric acid to settle, decanting the supernatant liquid, and centrifuging only the settled boric acid and residual liquid.

Another shortcoming of excessive water is the solubility of boric acid therein. The solubility factor may be minimized by adding water already saturated with boric acid. This mode of operation is desirable in the practice of the invention particularly in a continuous process. The filtrate from the centrifuge is allowed to settle into a water phase and an organic phase. Since the water phase was in contact with boric acid prior to centrifuging, it is essentially saturated with the acid and advantageously recycled. Additional water may be added with the recycle stream as necessary.

The instant invention is applicable to all types of centrifuging operations wherein the liquid passes through the solid filter cake. Such centrifuges are well known to those skilled in the art.

Another embodiment of the instant invention relates to the separation of boric acid from organic liquids wherein the boric acid is formed by hydrolysis in the presence of the organic liquid. For example, in the oxidation of cyclohexane with molecular oxygen, boric acid may be added to improve the oxidation selectivity to cyclohexanol. The liquid reaction product contains a mixture of unreacted cyclohexane and a cyclohexyl borate ester. By the introduction of a stoichiometric quantity of water the ester hydrolyzes to form cyclohexanol and a boric acid precipitate. In accordance with the invention additional water is added so as to at least saturate the organic liquid, i.e., the cyclohexane and cyclohexanol, and preferably to form a separate water phase. Thereafter, the mixture, in the form of a slurry, is centrifuged as described heretofore. Of course, the water of hydrolysis, the water of saturation and the excess water may be added simultaneously. No advantage is secured by adding the water in stages.

To further illustrate the instant invention attention is directed to the following examples. All parts are in parts by weight.

EXAMPLE 1

An organic liquid consisting of 1 part of cyclohexane, 0.131 part of cyclohexanol, and 0.013 part of cyclohexanone and containing 0.12 part of boric acid are slurried to form an anhydrous feed liquor for a comparative Run 1. This feed liquor is referred to herein as cyclohexane oil.

To show the advantage of the instant invention, sufficient water is added to the anhydrous material to saturate the organic liquid. This material is used as feed in Run 2.

In Run 3 additional water is added to form an excess water phase. A total of 1.6 parts of water per part of cyclohexanone-cyclohexanol are added.

Tests with the three feeds are performed in a Fletcher Mark 2 centrifuge (12" I.D. x 6" high perforated basket lined with cotton twill cloth). The slurried feed is introduced into the centrifuge while rotating at either 1200 G's or 620 G's as indicated in the table below. Drain rates are measured after the indicated cake thickness is built up. Results are shown as follows:

*Table I*

| Run | Feed | Centrifugal force, G's | Cake Thickness, inches | Drain Rate, gal./hr./ft.² of basket area |
|---|---|---|---|---|
| 1 | Anhydrous cyclohexane oil | 1,200 | 1 | 65 |
| 2 | Water saturated cyclohexane oil. | 1,200 | 1 | 136 |
| 3 | Water phase plus sat. cyclohexane oil. | 620 | 1½ | 136 |

The above data clearly indicates the advantage of the instant invention. When the organic liquid is saturated with water, Run 2, the drainage rate is twice as fast as the anhydrous case, Run 1. Run 3, wherein a separate water phase is present, illustrates a particularly preferred mode of the invention and gives very surprising and outstanding results. As compared to Run 1, the drainage rate is still twice as fast, despite the fact that about half the centrifugal force is applied and the cake thickness is 50% greater.

EXAMPLE 2

Varying amounts of water are added to a solution containing 0.165 part of cyclohexyl borate/part of cyclohexane. To a first portion sufficient water is added to provide the water of hydration of the ester and saturate the organic liquid. Excess water is added to a second portion of the ester solution so as to form a separate water phase. In both instances, boric acid precipitates and a slurry is formed. The two samples are subjected to filtration tests at 1200 G's centrifugal force as described in Example 1.

*Table II*

| Feed liquor | Cake Thickness, Inches | Drain Rate, gal./hr./ft.$^2$ of basket area |
|---|---|---|
| Cyclohexane oil plus water phase | 1 | 92 |
| Do | 1½ | 76 |
| Water saturated cyclohexane oil | ¾ | 45 |
| Do | 1¼ | 20 |

The above data further show the outstanding advantage of the presence of the water phase. Faster drain rates are obtained even with greater cake thicknesses.

EXAMPLE 3

Example 1 is repeated except that the organic liquid contains 1 part of methylcyclohexane, 0.13 part of methylcyclohexanol and 0.013 part of methylcyclohexanone. The comparative drain rates for the anhydrous, water saturated, and water saturated plus a separate water phase systems are essentially the same as shown in Table I.

EXAMPLE 4

Example 1 is repeated except that a 10% normal hexanol solution in hexane is the organic liquid. For the three runs, a marked improvement in drain rate is noted in the water saturated case as compared to the anhydrous case. In a third run, wherein a separate water phase is present, a still greater improvement in drain rate is noted. The relative drain rates are proportional to those shown in Table I.

It will be understood that modifications and variations may be affected without departing from the spirit of the invention.

We claim:

1. In a process wherein a hydrocarbon is oxidized with oxygen and boric acid is added to improve the oxidation selectivity to product alcohol, a liquid reaction product containing a mixture of unreacted hydrocarbon and hydrocarbon borate ester is formed, said ester is hydrolyzed with water to form solid boric acid admixed with a water immiscible liquid containing said unreacted hydrocarbon and product alcohol and the solid boric acid is thereafter separated by centrifugation, the improvement which comprises incorporating in said liquid reaction product mixture sufficient water in addition to that required for said hydrolysis to at least saturate said immiscible liquid whereby the rate of filtration in said centrifugal separation step is increased, and thereafter centrifuging the water containing mixture to separate said boric acid.

2. The method of claim 1 wherein sufficient water is incorporated to form a separate water phase.

3. The method of claim 1 wherein said water incorporated in said product mixture contains boric acid.

4. In a process wherein cyclohexane is oxidized with oxygen and boric acid is added to improve the oxidation selectivity to cyclohexanol, a liquid reaction product containing a mixture of unreacted cyclohexane and cyclohexyl borate ester is formed, said ester is hydrolyzed with water to form solid boric acid admixed with a water immiscible liquid containing said unreacted cyclohexane and cyclohexanol and the solid boric acid is thereafter separated by centrifugation, the improvement which comprises incorporating in said liquid reaction product mixture sufficient water in addition to that required for said hydrolysis to at least saturate said immiscible liquid whereby the rate of filtration in said centrifugal separation step is increased, and thereafter centrifuging the water containing mixture to separate said boric acid.

5. The method of claim 4 wherein sufficient water is incorporated to form a separate water phase.

6. The method of claim 4 wherein said water incorporated in said product mixture contains boric acid.

References Cited by the Examiner

UNITED STATES PATENTS 2,833,623  5/1958  May et al. _____ 23—149
3,011,871  12/1961  May et al. _____ 23—149

MAURICE A. BRINDISI, *Primary Examiner.*